United States Patent
Muske et al.

(10) Patent No.: US 11,500,226 B1
(45) Date of Patent: Nov. 15, 2022

(54) VIEWING AREA MANAGEMENT FOR SMART GLASSES

(71) Applicants: Scott Phillip Muske, Encinitas, CA (US); Joy Sargis Muske, Encinitas, CA (US)

(72) Inventors: Scott Phillip Muske, Encinitas, CA (US); Joy Sargis Muske, Encinitas, CA (US)

( * ) Notice: Subject to any disclaimer, the term of this patent is extended or adjusted under 35 U.S.C. 154(b) by 476 days.

(21) Appl. No.: 16/583,768

(22) Filed: Sep. 26, 2019

(51) Int. Cl.
| | |
|---|---|
| *G02C 7/08* | (2006.01) |
| *G06F 3/04895* | (2022.01) |
| *G02B 27/01* | (2006.01) |
| *G06F 3/01* | (2006.01) |

(52) U.S. Cl.
CPC .............. *G02C 7/086* (2013.01); *G02B 27/01* (2013.01); *G06F 3/011* (2013.01); *G06F 3/04895* (2013.01)

(58) Field of Classification Search
CPC ..... G02C 7/086; G02B 27/01; G06F 3/04895; G06F 3/011
See application file for complete search history.

(56) References Cited

U.S. PATENT DOCUMENTS

| | | | |
|---|---|---|---|
| 9,754,397 B1* | 9/2017 | Piemonte | G06Q 20/123 |
| 11,367,416 B1* | 6/2022 | Richter | G09G 5/36 |
| 2012/0169730 A1* | 7/2012 | Inoue | H04N 13/332 |
| | | | 345/419 |
| 2014/0201631 A1* | 7/2014 | Pornprasitsakul | G11B 27/031 |
| | | | 715/716 |
| 2016/0328882 A1* | 11/2016 | Lee | G02B 27/0172 |
| 2018/0255332 A1* | 9/2018 | Heusser | H04N 21/21805 |
| 2018/0293802 A1* | 10/2018 | Hendricks | G09B 23/30 |
| 2019/0096407 A1* | 3/2019 | Lam | G11B 27/34 |
| 2020/0039784 A1* | 2/2020 | Oggianu | B66B 5/0056 |
| 2020/0162509 A1* | 5/2020 | Ballot | G06F 40/30 |
| 2021/0373676 A1* | 12/2021 | Jorasch | G06F 3/0383 |
| 2022/0114327 A1* | 4/2022 | Faaborg | G06V 30/412 |
| 2022/0182760 A1* | 6/2022 | Hanley | G02B 27/0176 |
| 2022/0222448 A1* | 7/2022 | Huang | G06T 7/11 |

* cited by examiner

*Primary Examiner* — Ariel A Balaoing
(74) *Attorney, Agent, or Firm* — Plager Schack LLP; Mark H. Plager; Stephen Hallberg

(57) ABSTRACT

A smart glasses viewing area management system and processes for managing content display in smart glasses according to a relationship between a content viewing area and a field of view of a user are disclosed. The smart glasses viewing area management system enables caption glasses to define a viewing cone area for multiple devices with methodology to turn content on or off when a user chooses to focus on an object(s). When a person is watching TV and turns to talk with the person next to them the captions will stop displaying on the caption glasses.

8 Claims, 9 Drawing Sheets

VIEWING AREA MANAGEMENT FOR SMART GLASSES

BACKGROUND

Embodiments of the invention described in this specification relate generally to content display in smart glasses, and more particularly, to a smart glasses viewing area management system and processes for managing content display in smart glasses.

Digital content streamed to smart glasses, such as captions, is displayed without taking into account a viewing area(s) of the person using the glasses. Current smart glasses use a camera to identify, target, and determine location of an object with respect to the person wearing the glasses. The methodology requires significant computation and battery power whilst introducing a significant time lag. Further, the use of a camera on the glasses introduces undesired privacy issues and has been banned from use in many public venues. GPS can used to identify the location of the object, but lacks the accuracy required to select between multiple objects in close proximity. Without a method of accurately identifying were an object is located in relationship to the glasses, it is not possible for the glasses to determine what information to display when the person looks at an object, such as a TV or a person speaking. An easy to use method for turning captions on and off for different video or audio sources is absent on current glasses.

Existing smart glasses do not manage when content is to be displayed or allow selection of content to be displayed. Existing smart glasses use a camera, GPS, and gyroscope to determine what content to display, without implementing a method to turn content off, without addressing privacy concerns and require significant computational power to operate.

Therefore, what is needed is a way to enable smart glasses (hereinafter interchangeably referred to as smart glasses, caption glasses, or intelligent viewing glasses) to define a viewing cone area for multiple devices with methodology to turn content on or off when a user chooses to focus on one or more object(s), such that when a person is watching TV with captions displayed in caption glasses, for example, and turns to talk with another person next to them (turning away from the TV), the captions will stop displaying on the caption glasses.

BRIEF DESCRIPTION

A novel smart glasses viewing area management system and processes for managing content display in intelligent viewing glasses are disclosed. In some embodiments, the intelligent viewing glasses are smart glasses or caption glasses. In some embodiments, the smart glasses viewing area management system enables intelligent viewing glasses to define a viewing cone area for multiple devices. In some embodiments, the smart glasses viewing area management system performs realtime field of view analysis of the intelligent viewing glasses in relationship with the defined viewing cone area and antennas disposed along an outer frame of the intelligent viewing glasses when worn by a viewer to turn content on or off when a user chooses to focus on a view object. An example of content that is turned on or off depending on the object of focus is textual captions associated with audio from a video content source. A view object in this context can be a single object or multiple objects in a group. In some embodiments, when a person is watching TV and turns to talk with the person next to them the captions will stop displaying on the intelligent viewing glasses and will start displaying captions on the intelligent viewing glasses when the person turns back to the TV (as the view object with an ultra wideband RF tag and while video content is played).

In some embodiments, the smart glasses viewing area management system performs realtime field of view analysis by calculating distances between the intelligent viewing glasses and the view object and between antennas present along the frame of the intelligent viewing glasses. In some embodiments, the realtime field of view analysis enables the intelligent viewing glasses to create a viewing cone that is associated with an ultra wideband RF tag at an A/V content source. In some embodiments, wireless signal communication over ultra wide band frequency is employed by ultra wideband RF components in the smart glasses viewing area management system.

In some embodiments, the processes for managing content display in intelligent viewing glasses include a viewing bridge run-time process, an intelligent viewing glasses run-time process, and a mobile viewing bridge run-time process.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

Figure 1:
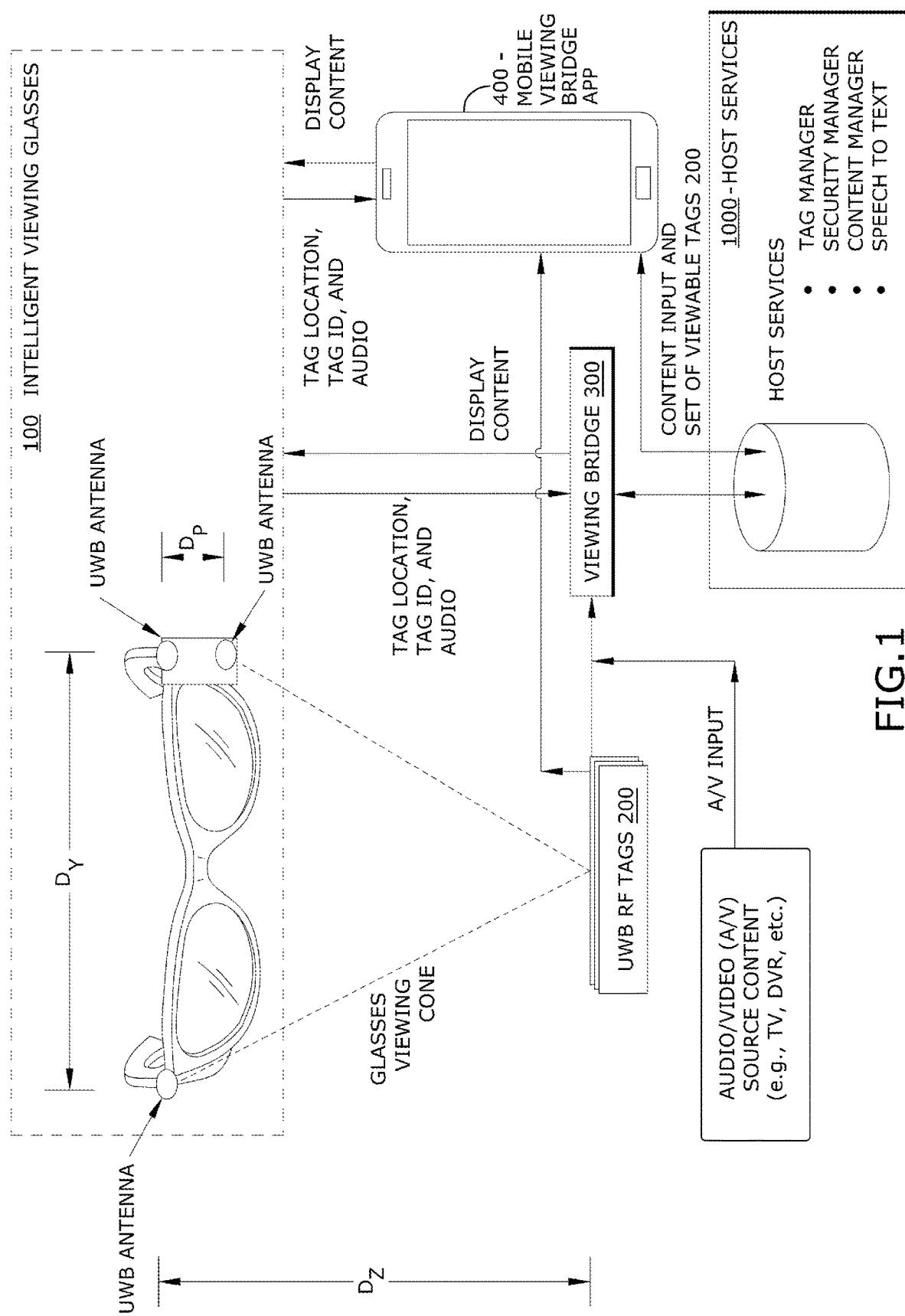

Having thus described the invention in general terms, reference is now made to the accompanying drawings, which are not necessarily drawn to scale, and which show different views of different example embodiments, and wherein:

FIG. 1 conceptually illustrates a smart glasses viewing area management system in some embodiments.

Figure 2:
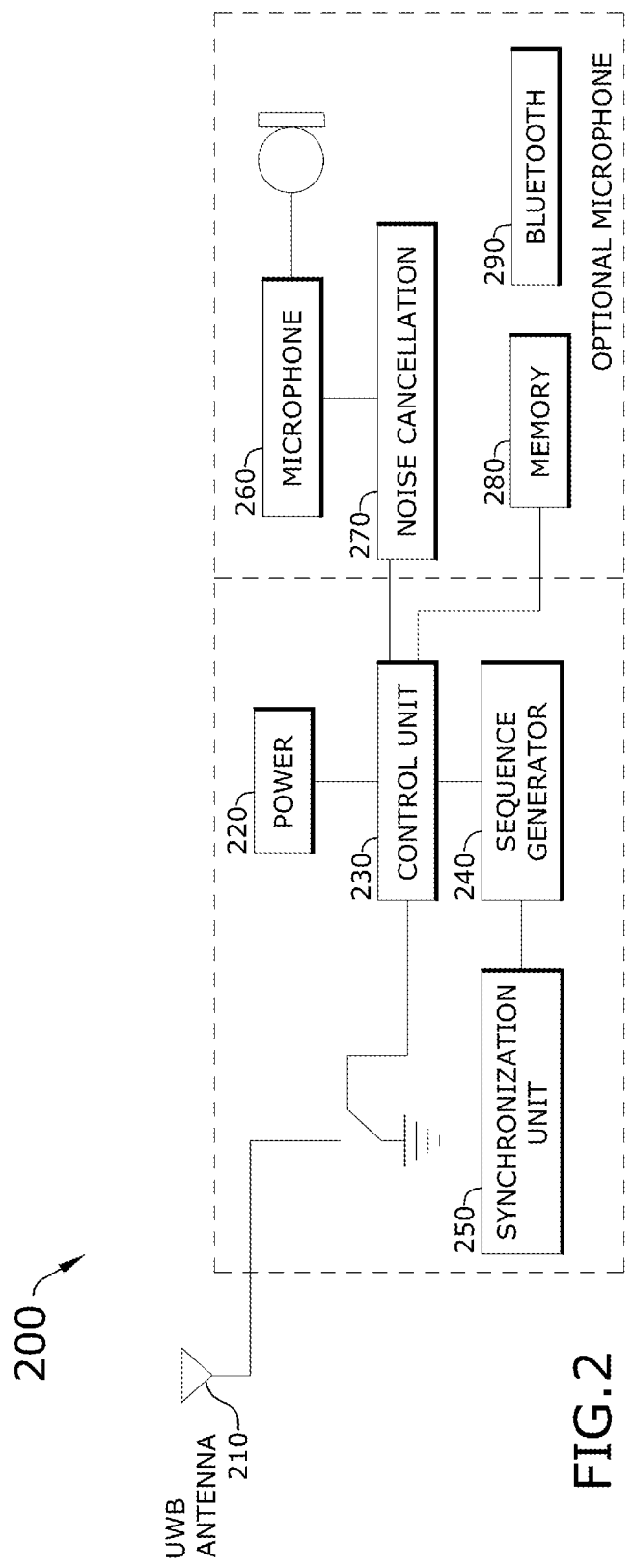

FIG. 2 conceptually illustrates a block diagram of an ultra-wide band (UWB) RF tag in some embodiments of the smart glasses viewing area management system.

Figure 3:
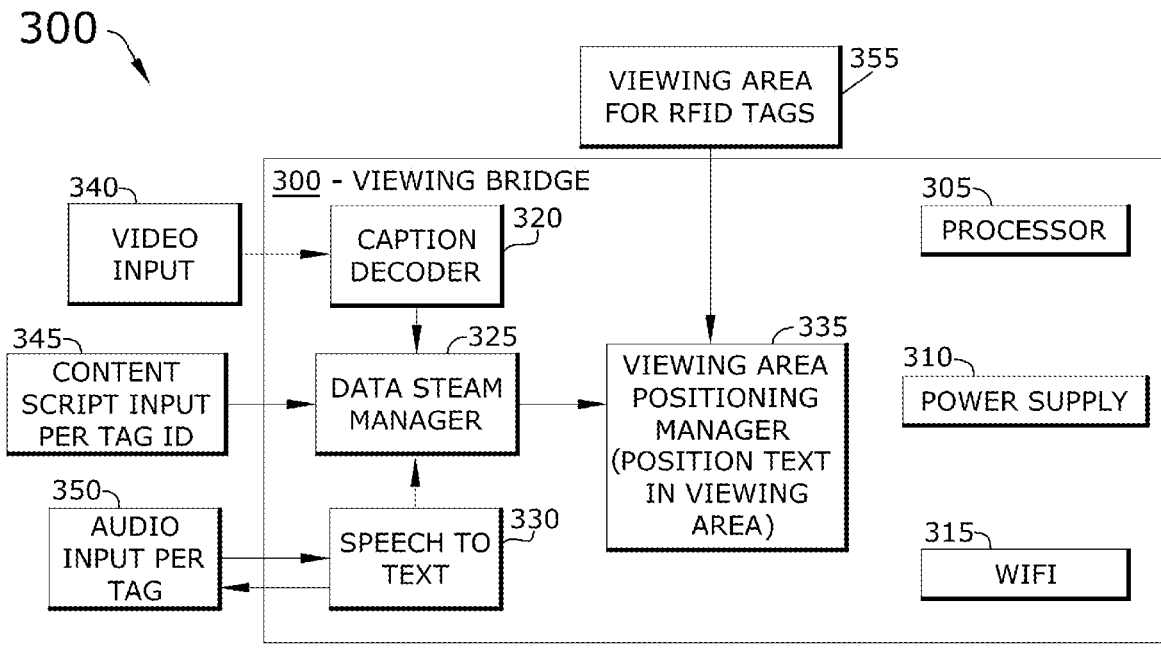

FIG. 3 conceptually illustrates a block diagram of a viewing bridge content manager in some embodiments of the smart glasses viewing area management system.

Figure 4:
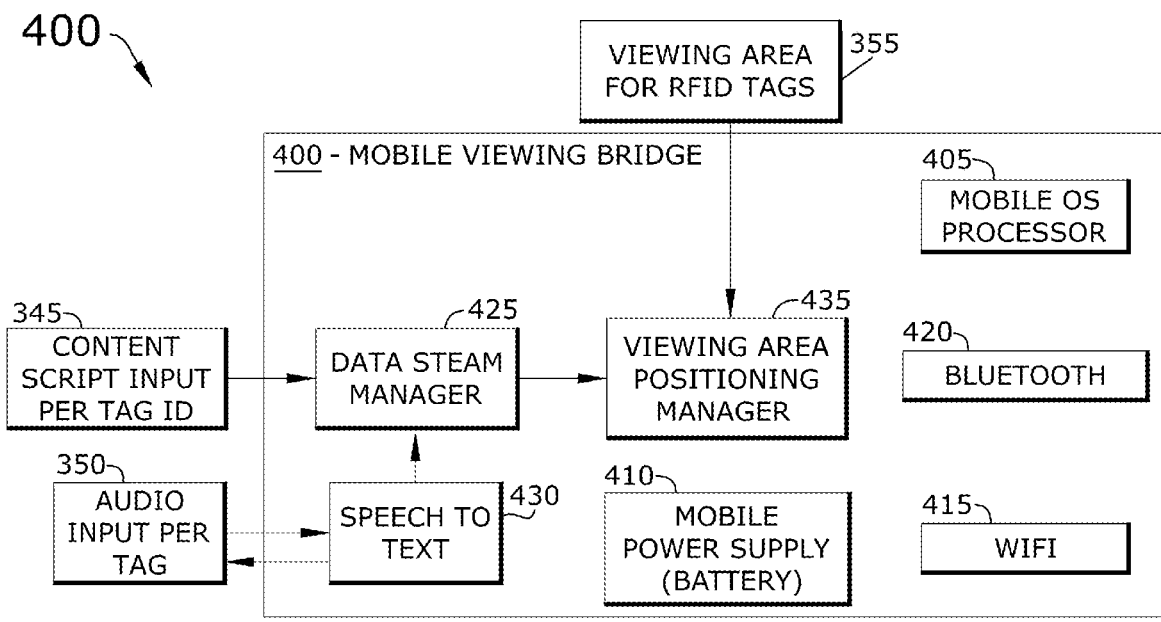

FIG. 4 conceptually illustrates a block diagram of a mobile viewing bridge content manager in some embodiments of the smart glasses viewing area management system.

Figure 5:
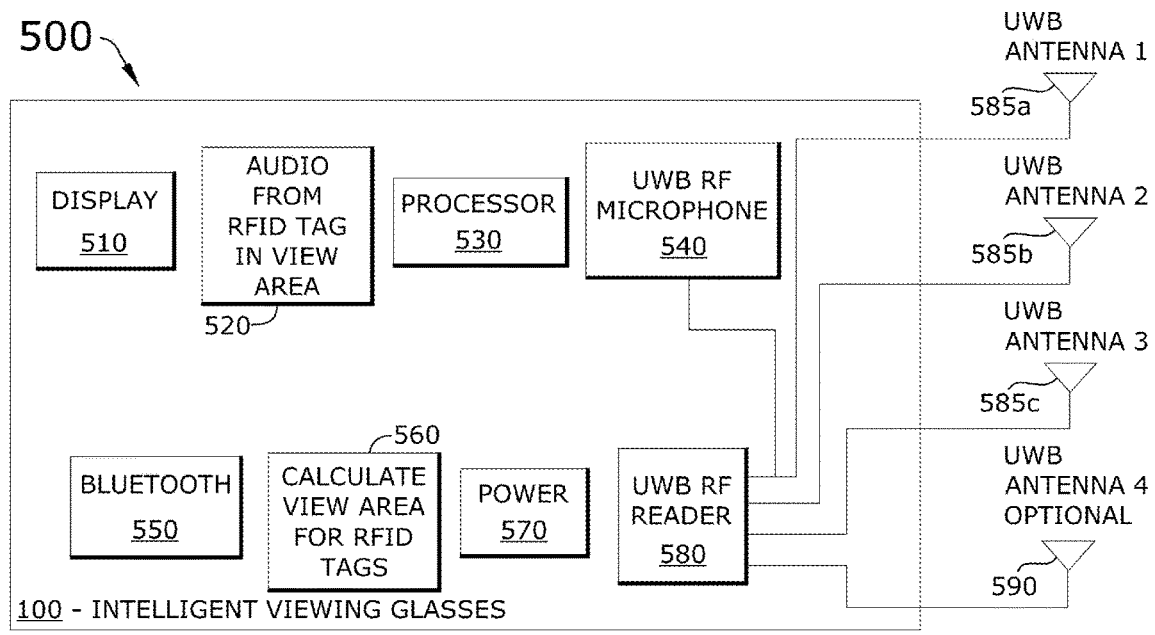

FIG. 5 conceptually illustrates a block diagram of intelligent viewing glasses in some embodiments of the smart glasses viewing area management system.

Figure 6:
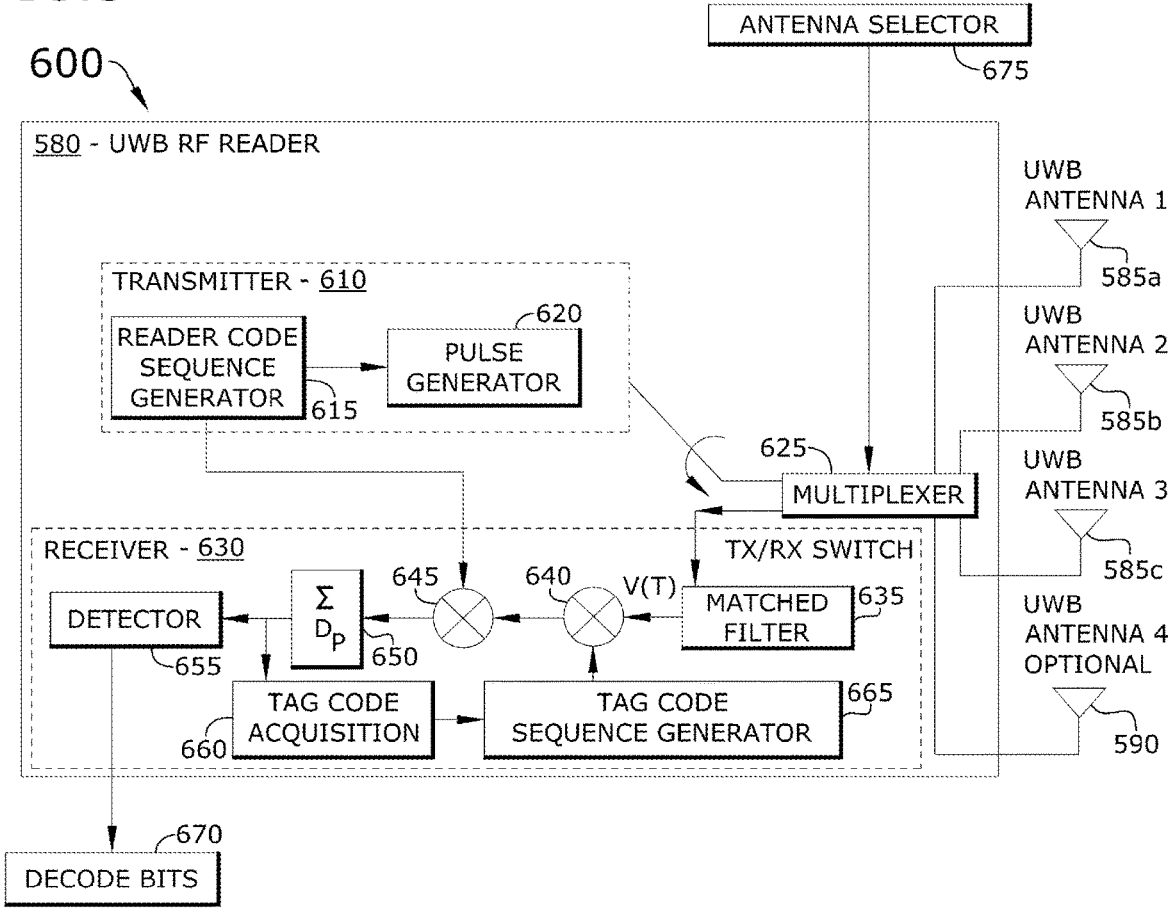

FIG. 6 conceptually illustrates a block diagram of an UWB RF reader of the intelligent viewing glasses in some embodiments of the smart glasses viewing area management system.

Figure 7:
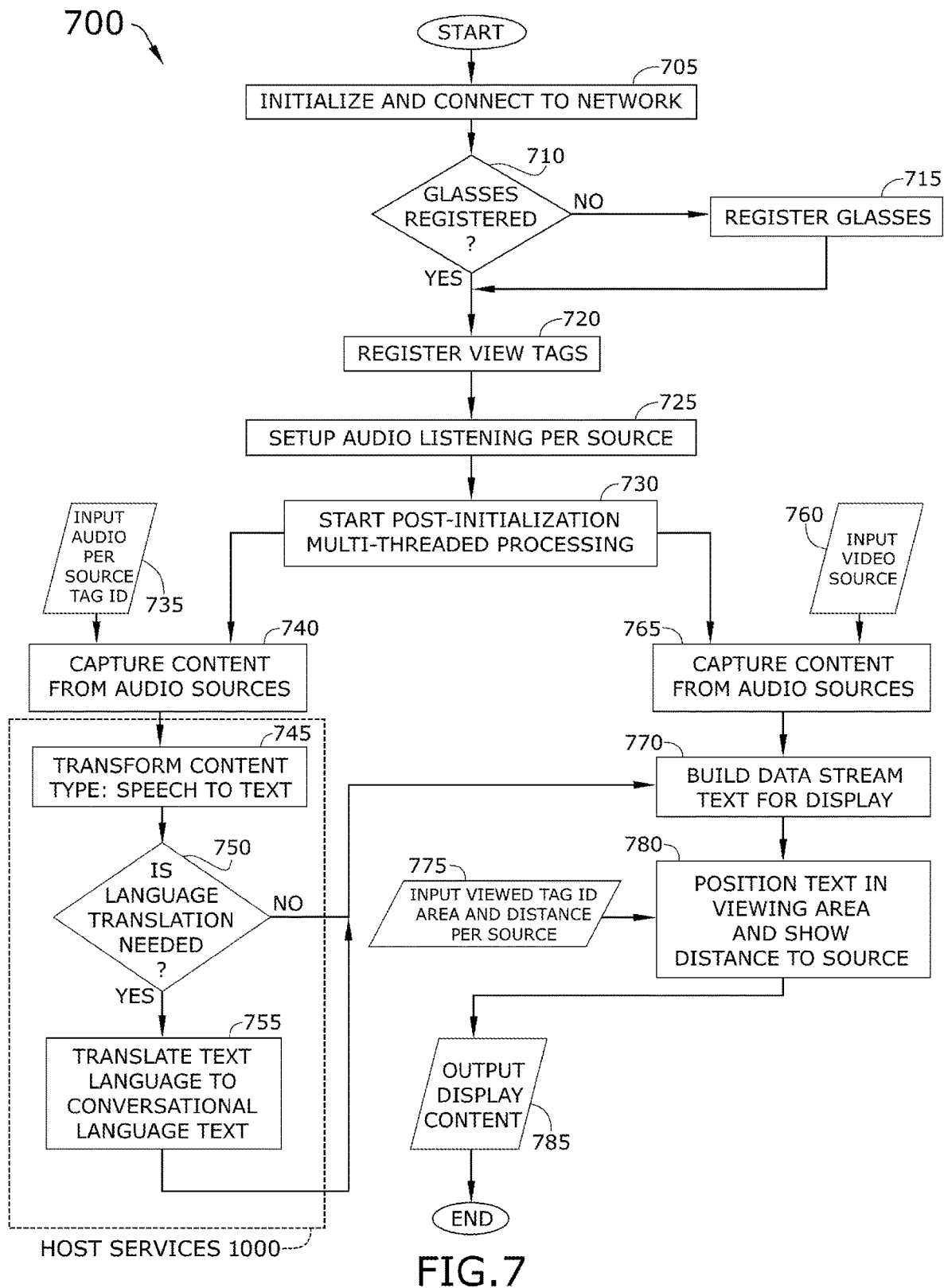

FIG. 7 conceptually illustrates a viewing bridge run-time process for a viewing bridge content manager in some embodiments.

Figure 8:
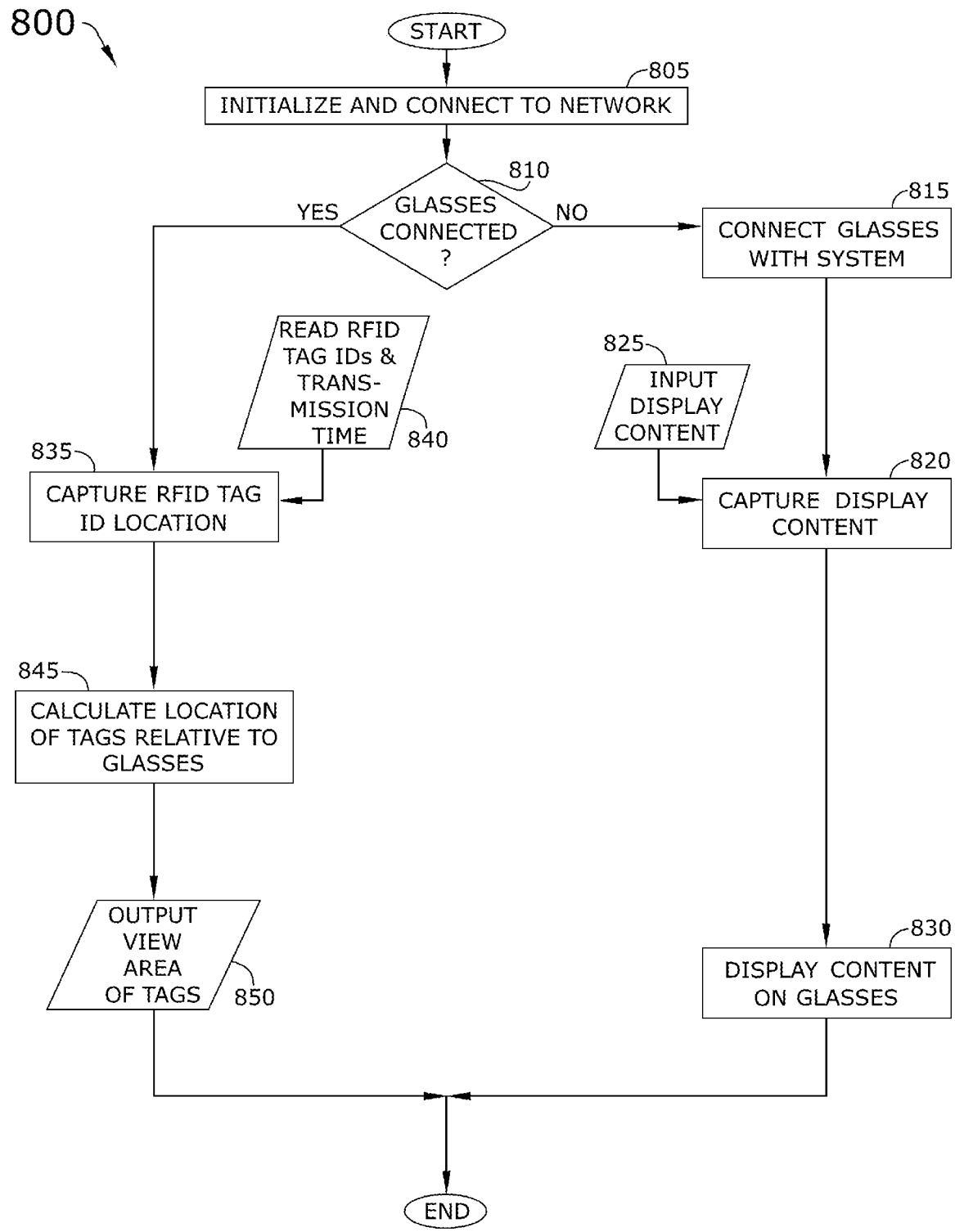

FIG. 8 conceptually illustrates an intelligent viewing glasses run-time process for intelligent viewing glasses in some embodiments.

Figure 9:
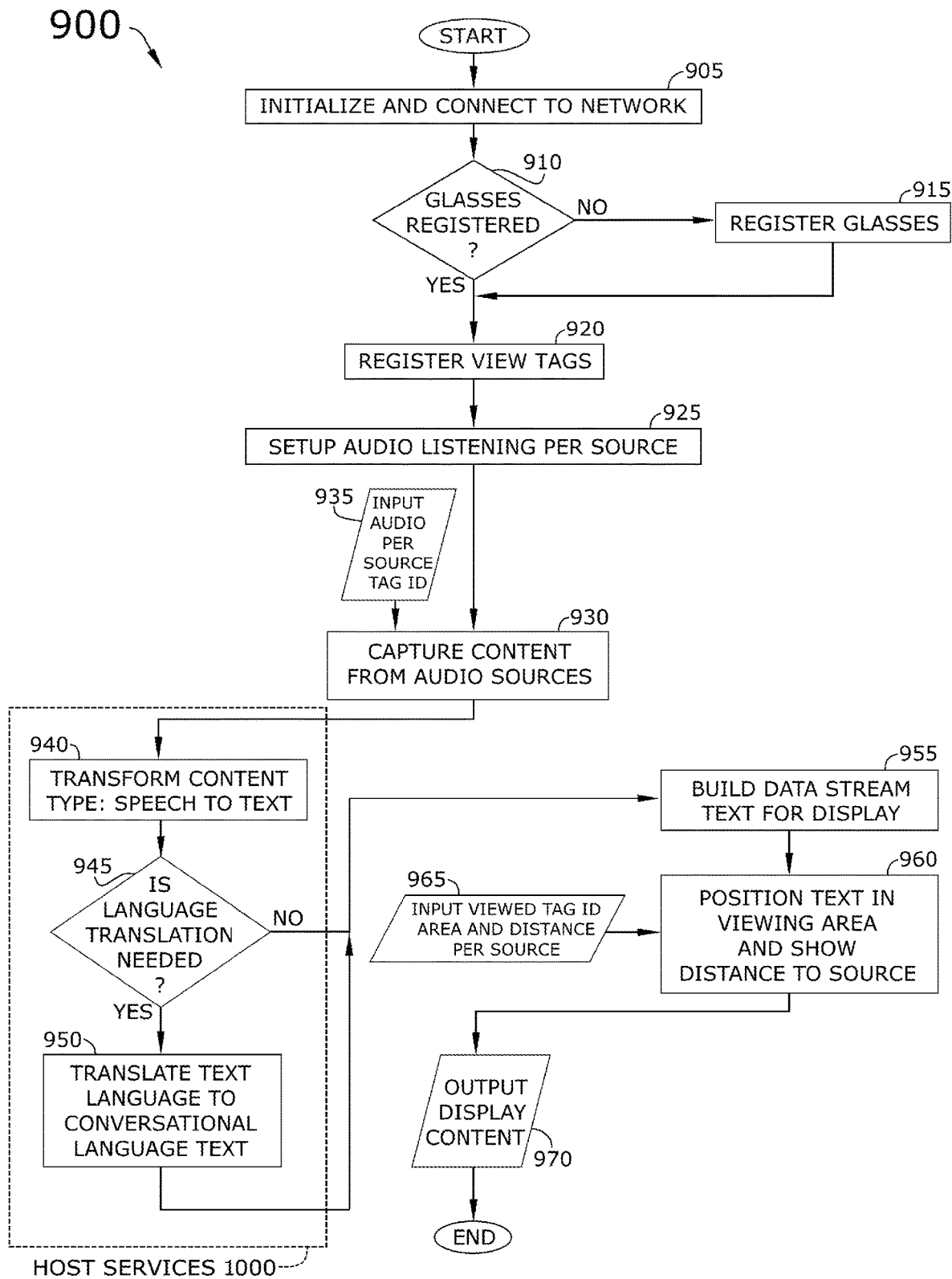

FIG. 9 conceptually illustrates a mobile viewing bridge run-time process for a mobile device in some embodiments.

Figure 10:
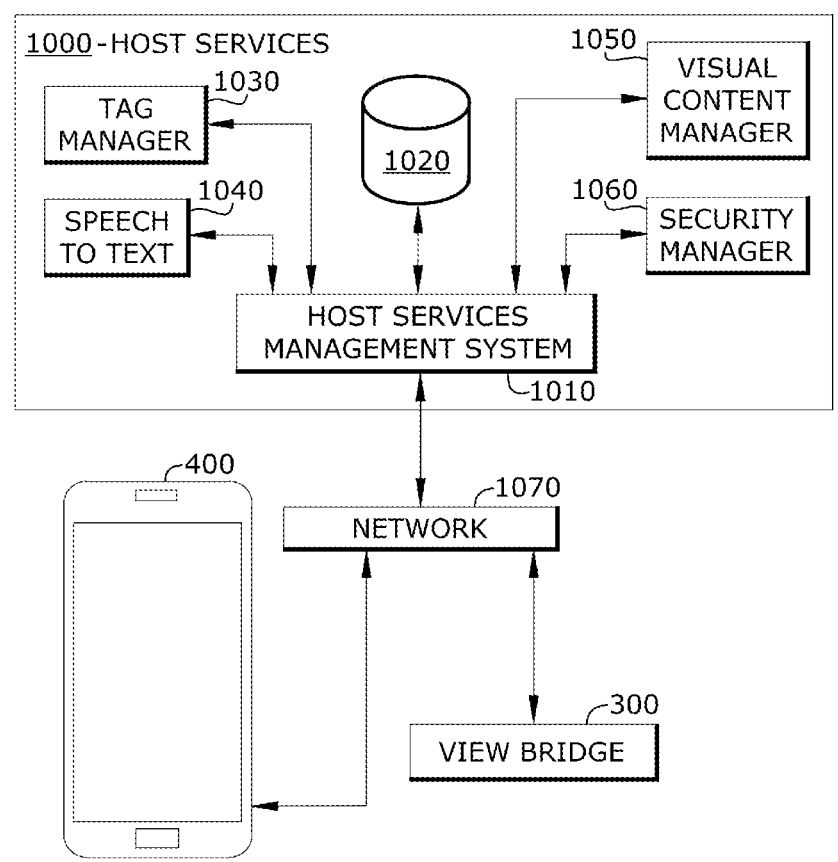

FIG. 10 conceptually illustrates host services of a smart glasses viewing area management system in some embodiments.

Figure 11:
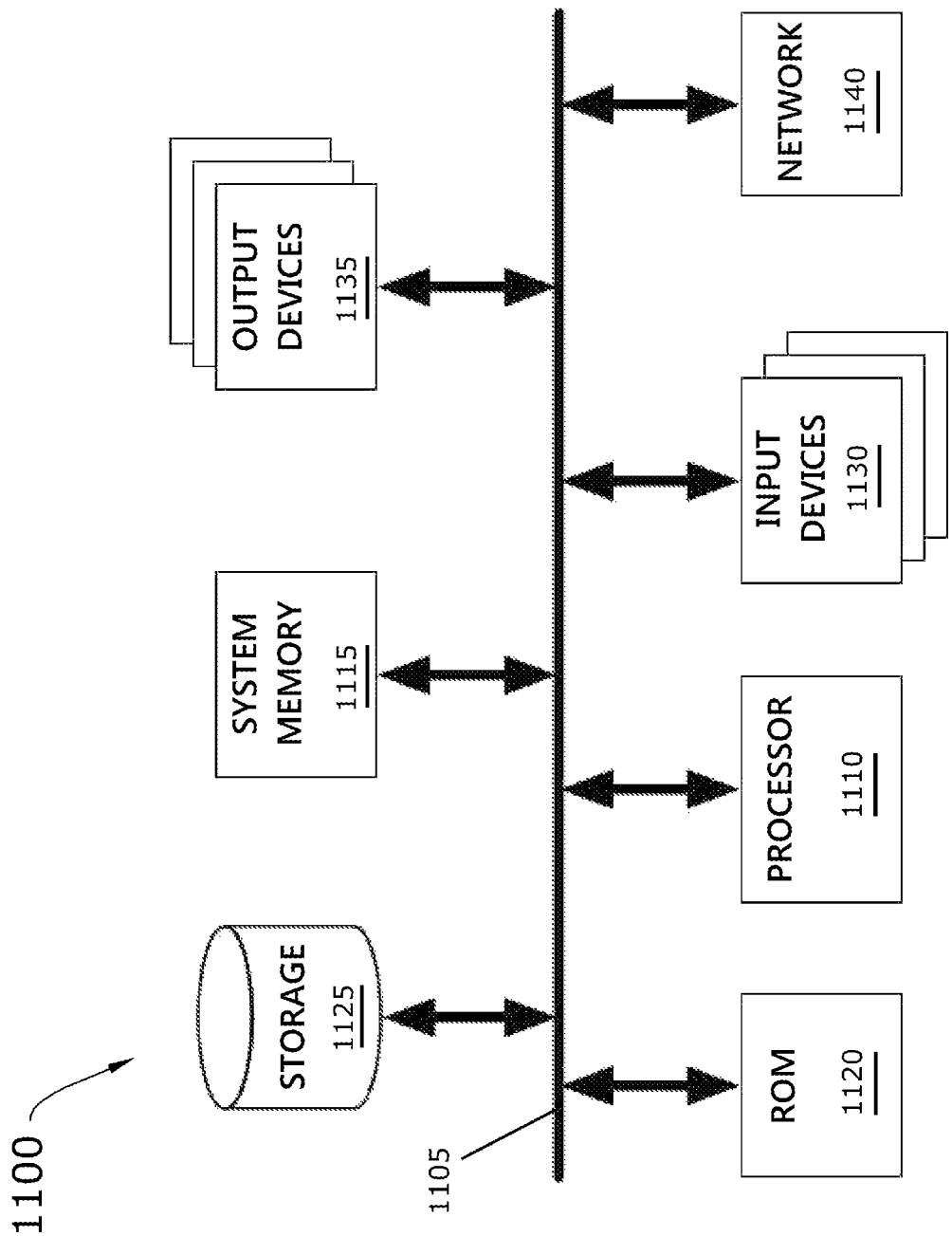

FIG. 11 conceptually illustrates an electronic system with which some embodiments of the invention are implemented.

DETAILED DESCRIPTION

In the following detailed description of the invention, numerous details, examples, and embodiments of a smart glasses viewing area management system and processes for managing content display in intelligent viewing glasses according to a relationship between a content viewing area and a field of view of a user are described. In this description certain trademarks, word marks, and/or copyrights are referenced, including Wi-Fi®, which is a registered trademark of Wi-Fi Alliance, and the Bluetooth® word mark and logo, which are registered trademarks owned by Bluetooth SIG, Inc. However, it will be clear and apparent to one skilled in the art that the invention is not limited to the embodiments set forth and that the invention can be adapted for any of several applications, with or without reference to noted trademarks, word marks, and/or copyrights.

Some embodiments of the invention include a novel smart glasses viewing area management system and novel processes for managing content display in intelligent viewing glasses. In some embodiments, the intelligent viewing glasses are smart glasses or caption glasses. In some embodiments, the smart glasses viewing area management system enables intelligent viewing glasses to define a viewing cone area for multiple devices. In some embodiments, the smart glasses viewing area management system performs realtime field of view analysis of the intelligent viewing glasses in relationship with the defined viewing cone area and antennas disposed along an outer frame of the intelligent viewing glasses when worn by a viewer to turn content on or off when a user chooses to focus on a view object. An example of content that is turned on or off depending on the object of focus is textual captions associated with audio from a video content source. A view object in this context can be a single object or multiple objects in a group. In some embodiments, when a person is watching TV and turns to talk with the person next to them the captions will stop displaying on the intelligent viewing glasses and will start displaying captions on the intelligent viewing glasses when the person turns back to the TV (as the view object with an ultra wideband RF tag and while video content is played).

In this specification, ultra wide band (or ultra wideband "UWB") means radio frequency (RF) signal-based communication typically in the frequency range from 3.1 to 10.6 GHz. Ultra wideband works by UWB wireless radios or RF tags and transmitters which send short signal pulses over a broad spectrum that includes several frequency channels at once. For example, a UWB signal centered at 5 GHz typically extends across 4 GHz and 6 GHz. Ultra wideband typically supports high wireless data rates of 480 Mbps up to 1.6 Gbps, at distances up to a few meters, but marked reduction in UWB data rates occurs at longer distances.

In some embodiments, the smart glasses viewing area management system performs realtime field of view analysis by calculating distances between the intelligent viewing glasses and the view object and between antennas present along the frame of the intelligent viewing glasses. In some embodiments, the realtime field of view analysis enables the intelligent viewing glasses to create a viewing cone that is associated with an ultra wideband RF tag at an A/V content source. In some embodiments, wireless signal communication over ultra wide band frequency is employed by ultra wideband RF components in the smart glasses viewing area management system.

In this specification, there are several descriptions of methods and processes that are implemented as software applications or computer programs which run on computing devices to perform the steps of the processes for managing content display in intelligent viewing glasses according to a relationship between a content viewing area and a field of view of a user. In particular, the processes for managing content display in intelligent viewing glasses described in this specification include a viewing bridge run-time process, an intelligent viewing glasses run-time process, and a mobile viewing bridge run-time process. However, it should be noted that for the purposes of the embodiments described in this specification, the word "method" is used interchangeably with the word "process". Processes or methods for managing content display in intelligent viewing glasses according to a relationship between a content viewing area and a field of view of a user are described, therefore, by reference to example flow chart diagrams that conceptually illustrate steps of one or more processes for managing content display in intelligent viewing glasses.

As stated above, digital content streamed to smart glasses, such as captions, is displayed without taking into account viewing area(s) of the person using the smart glasses. Existing conventional smart glasses use a camera to identify, target, and determine object location(s) with respect to the person wearing the smart glasses. The methodology of conventional smart glasses requires significant computation and battery power. However, even with significant computational resources and power available, the methodology of conventional smart glasses introduces a significant time lag. Furthermore, the use of a camera on the smart glasses introduces undesired privacy issues and has been banned from use in many public venues. Global positioning system (GPS) technology can be used to identify object location(s), but lacks the accuracy required to select between multiple objects in close physical proximity. Without a method of accurately identifying object location with respect to smart glasses of a viewer, it is not possible for the smart glasses to determine what information to display when the viewer looks at an object, such as a TV or a person speaking. An easy to use method for turning captions on and off for different video or audio sources is absent from the existing conventional smart glasses available to viewers/users of such glasses.

Embodiments of the smart glasses viewing area management system and processes for managing content display in smart glasses described in this specification solve such problems by way configuring a wireless communication network between smart glasses and target object(s) which allows for object identification such that targeting the object to be viewed is accomplished with relative ease, thereby enabling the smart glasses to manage a viewing area based on the selected object location. Specifically, the smart glasses viewing area management system includes two conceptual parts. One part of the smart glasses viewing area management system includes a display management system that provides content, such as captions, to the smart glasses based on an identified object in a viewing cone area loosely related to a field of view of a viewer wearing the smart glasses. A second part of the smart glasses viewing area management system is an operational aspect in which the smart glasses display the content (such as captions) when the smart glasses are in the specified viewing cone area for the object being viewed and oriented in a manner that is appropriate for viewing the object. In other words, the smart glasses display captions when in the viewing cone and when the lenses of the smart glasses are oriented in a way that would allow a user of the smart glasses to direct his or her eye vision through the lenses toward the object. While it would be common for the smart glasses to be worn by a user seeking to read the captions while watching video content on a video screen or while looking at and talking to another person, it is within the scope of the smart glasses viewing area management system that the smart glasses can display captions (or other intended content) without a human user wearing the glasses, so long as the glasses are operational (power is turned on) and are within the viewing cone of and oriented appropriately for the lenses to face the object. However, most practical use will involve a person wearing the smart glasses in connection with the smart glasses viewing area management system to enable the smart glasses to display content (such as captions) only when the person looks at the object (the object which is associated with the captions, such as a television on which is displayed a video with an audio portion that is captioned for the benefit of anyone who may be hard of hearing or who simply wishes to read captions of the audible portions). Furthermore, the smart glasses viewing area management system also enables a person to seamlessly switch between different objects based on the viewing cone areas for multiple video or audio objects.

Embodiments of the smart glasses viewing area management system and processes for managing content display in smart glasses described in this specification differ from and improve upon currently existing options. In particular, existing conventional smart glasses which use a camera to identify, target, and determine object location(s) with respect to the person wearing the smart glasses. In contrast, the smart glasses viewing area management system and processes for managing content display in smart glasses of the present disclosure takes into account the viewing cone area(s) of a person wearing that smart glasses and only displays content for the display object in the view area when the smart glasses are directed toward the display object. Similarly, the smart caption glasses of the smart glasses viewing area management system stop displaying content (captions) when the smart caption glasses are not in the viewing cone area or are directed away from the object (even when the glasses are technically still in the viewing cone area).

In some embodiments, the smart glasses viewing area management system allows users of the smart caption glass to transition between objects by enabling the smart caption glasses to calculate the current viewing cone area the person is focused on in relation to nearby viewing cone areas associated with other nearby objects.

In addition, some embodiments of the smart glasses viewing area management system improve upon the currently existing conventional smart glasses which continually display content, regardless of the direction of gaze of the user (or field of vision of the user, or orientation of the lenses of the smart glasses of a user who turns his or her head away from the content-providing object). It can be both a distraction and an annoyance to have captions (or other smart glasses content) continuously displayed no matter where the user may be looking at any given moment. Not only is it distracting and annoying to the user of the smart glasses, but it can be distracting and annoying to other people interacting with users of the smart glasses (e.g., in a social setting). For instance, when a person is watching TV with smart glasses and turns to talk with another person next to them, the continuous display of TV captions makes it hard for both the user of the smart glasses and the other person to pay attention to each other.

In some embodiments, a UWB RF tag is attached to a person wearing a microphone (a "speaker"), such that the speaker becomes an object the smart caption glasses can target. In such a scenario, when the speaker speaks, the speech can be transcribed to text such that when the person wearing smart glasses focuses on the speaker, the speaker's transcribed text (speech) is shown as captions on the smart glasses. When another object is present nearby, such as a video monitor that visually outputs audio/video content, the smart glasses viewing area management system allows the person wearing the smart glasses to seamlessly change their visual focus from the speaker to the other nearby object and back again, with smooth transitions between caption streams from the two audio sources. Specifically, the smart glasses viewing area management system enables the smart caption glasses to do this with ease by defining the viewing cone area each object among multiple objects (or devices) with the UWB RF tags, and with methodology to turn content on or off when a user of the smart glasses chooses to focus on one or another object. In this way, even when a person is watching TV with the smart glasses and turns to talk with a friend next to them, it is possible for the smart glasses viewing area management system to know that the person has turned away from the TV and to stop displaying the captions in the captions glasses until the user turns back toward the TV.

In some embodiments, the smart glasses changes a display setting of the captions displayed in the smart captions glasses when the user of the smart glasses turns away from an object with a defined viewing cone area toward an area with no object that has a defined viewing cone area. The display setting includes one or more of a text size setting, a text brightness intensity setting, and a text opacity setting. Thus, the smart glasses of some embodiments changes one or more of the display settings of the captions when the user turns away from the object toward no other known object. For example, the user may turn away from an object, such as a TV, with a defined viewing cone area, and look toward a friend or somewhere else without a defined viewing cone area, and upon turning away from the object (TV), just reduce the size of the captions displayed in the smart glasses while continuing to stream the captions (in smaller text format) until the user turns back to the TV, at which point the smart glasses returns to the normal captions display size. The same scenario can apply separately for text brightness/intensity (e.g., normal brightness when user faces the object, but only half brightness when turning away) or text opacity (e.g., opaque when user is facing the object and in the viewing cone area, translucent when user's field of view is directed elsewhere), or in combination with any of the other settings, and other displays settings which are not noted here.

The smart glasses viewing area management system of the present disclosure may be comprised of the following elements. This list of possible constituent elements is intended to be exemplary only and it is not intended that this list be used to limit the smart glasses viewing area management system of the present application to just these elements. Persons having ordinary skill in the art relevant to the present disclosure may understand there to be equivalent elements that may be substituted within the present disclosure without changing the essential function or operation of the smart glasses viewing area management system.

1. A View Object
2. UWB RF Tag
3. Viewing Bridge device (either/both of mobile device and non-mobile "Oorcas Box" device)
4. Smart Glasses (aka, captions glasses, intelligent viewing glasses, etc.)
5. Glasses UWB RF Reader
6. UWB RF Reader The various elements of the smart glasses viewing area management system of the present disclosure may be related in the following exemplary fashion. It is not intended to limit the scope or nature of the relationships between the various elements and the following examples are presented as illustrative examples only.

The view object is the object that the person wearing caption glasses is focused on. This object will have an RF Tag (i.e., UWB RF tag) attached to it that allows the caption glasses (i.e., smart glasses) to identify and track the location of the object and calculate a viewing cone for displaying content.

The UWB RF Tag is an ultra wide band (UWB) radio frequency (RF) tag that is placed on the view object to which the smart glasses generates the viewing cone for displaying content. The UWB RF tag (aka, RF tag, or simply, tag) includes a unique ID ("UID"), the position relative to the smart glasses, and the size of the area that will be used for the viewing cone.

The viewing bridge device (aka, "Oorcas Box") is a device that is paired with a specific RF Tag and receives input from a video stream, audio stream, and/or other content intended for display on the smart glasses. Video streams are decoded and captions are transmitted to the caption glasses. Audio streams trigger a speech-to-text engine to translate speech to text and transmit the caption text to the caption glasses. In some embodiments, the speech-to-text depends on a security setting as to whether or not the user has permission to access the object. The caption glasses register with the viewing bridge device. In some embodiments, the caption glasses register wirelessly via WiFi. In some embodiments, all information is transmitted wirelessly to at least one of the smart glasses or a mobile device via WiFi. In some embodiments, the mobile device connects wirelessly to the smart glasses via Bluetooth and displays the captions to glasses display.

The Smart Glasses (aka, captions glasses, intelligent viewing glasses, "Oorcas Smart Glasses", etc.) utilize an RF reader and three RF antennas to acquire the RF tag position and calculate the active viewing cone area for caption display. In some embodiments, the viewing cone area is calculated for the object being viewed by the person wearing the smart glasses (aka, captions glasses). When the person looks at the object, the caption glasses register the object with the viewing bridge device (e.g., the "Oorcas Box") and requests transmission of the display information to the captions glasses. When the person moves the captions glasses outside of the calculated viewing cone area associated with the object, the display information (captions) is turned off.

The glasses UWB RF reader is an RF reader that enables the smart glasses to read three different antenna locations and calculate the viewing cone area.

The UWB RF reader is another RF Reader, but instead of being utilized by the smart glasses, is deployed in connection with the viewing bridge device (e.g., the "Oorcas Box"). In some embodiments, the UWB RF reader is used by the viewing bridge device to determine whether the RF tag matches the input (one or more of the input video stream, the content, audio stream, etc.) being sent to be transmitted to the smart glasses.

The details of the smart glasses viewing area management system described above are presented for explanatory purposes and other general purposes of illustration, but are not intended to be limiting to just these embodiments. While these embodiments of the smart glasses viewing area management system have been described with reference to numerous specific details, one of ordinary skill in the art will recognize that the smart glasses viewing area management system can be embodied in other specific forms without departing from the spirit of the invention. Thus, one of ordinary skill in the art would understand that the smart glasses viewing area management system is not to be limited by the foregoing illustrative details. As such, several more detailed embodiments are described in the sections below. Section I describes a smart glasses viewing area management system and components of the smart glasses viewing area management system. Section II describes several processes for managing content display in smart glasses according to a relationship between a content viewing area and a field of view of a user. Section III describes host services that provide realtime network-based services for the smart glasses viewing area management system of some embodiments. Section IV describes an electronic system that implements one or more of the methods and processes.

Smart Glasses Viewing Area Management System

By way of example, FIG. 1 conceptually illustrates a smart glasses viewing area management system in some embodiments. As shown in this figure, the smart glasses viewing area management system includes intelligent viewing glasses 100, ultra-wide band (UWB) RF tags 200, a viewing bridge 300 (aka, "viewing bridge content manager device", a mobile viewing bridge (app) 400, and host services 1000.

In some embodiments, the intelligent viewing glasses include a plurality of UWB antennas. In some embodiments, the plurality of antennas of the intelligent viewing glasses includes three UWB antennas. In some embodiments, the plurality of antennas of the intelligent viewing glasses includes four UWB antennas. In this example, the intelligent viewing glasses 100 includes three UWB antennas. Specifically, two UWB antennas ("top and bottom UWB antennas") are stacked along a first front-facing side of the intelligent viewing glasses 100 and a third UWB antenna (opposite the top UWB antenna along the first front-facing side) is disposed along a second front-facing side of the intelligent viewing glasses 100. A first distance $D_F$ is shown between the two stacked UWB antennas along the first front-facing side of the intelligent viewing glasses 100. A second distance $D_Y$ is shown between the first front-facing side and the second front-facing side of the intelligent viewing glasses 100. A third distance $D_Z$ is shown from the third UWB antenna to UWB RF tags 200.

When used in conjunction with the UWB RF tags 200, the intelligent viewing glasses 100 form a viewing cone that spans the third distance $D_Z$ from the glasses 100 to the UWB RF tags 200. Typically, the UWB RF tags 200 are positioned nearby or on a content source, such as an audio visual (A/V)

source that provides A/V content. Some non-limiting examples of A/V sources that provide A/V content include television (TV), a stored content display such as a screen with a digital video record (DVR), etc. The viewing cone that is formed by the intelligent viewing glasses 100, therefore, is a viewing cone of the A/V content associated with the UWB RF tags 200.

The USB RF tags 200 are identified by the viewing bridge 300, thereby allowing the A/V content to be enhanced with appropriate captions when the A/V content is streamed, played, and/or displayed. In some embodiments, the intelligent viewing glasses 100 provide the tag location, the tag ID, and audio to the viewing bridge 300, while the A/V source content is provided as A/V input to the viewing bridge 300. In some embodiments, the viewing bridge provides the tag location, the tag ID, and audio to host services 1000, which includes a host services management server and database, a tag manager, a security manager, a content manager, a speech-to-text module. Based on the tag location and the tag ID, the host services triggers the tag manager to retrieve captions from the database or, in the absence of existing captions for the A/V input provided to the viewing bridge 300 in connection with the tag location and the tag ID of the UWB RF tags 200, triggers the speech-to-text module to transcribe captions based on the audio provided to host services 1000. When captions are retrieved (or generated based on the audio), the content manager is triggered by host services 1000 to stream the captions as feed into the intelligent viewing glasses 100 while the A/V source content is being viewed by a person wearing the intelligent viewing glasses 1000. Therefore, host services 1000 transmits the captions back to the viewing bridge 300 which passes the captions on to the intelligent viewing glasses 100 to be scrolled or displayed in real-time during viewing of the A/V source content by the person wearing the intelligent viewing glasses 100. Similarly, when using a mobile device to view A/V content, the mobile viewing bridge (app) 400 performs several of the functions of the viewing bridge 300.

This example demonstrates how captions or enhanced display can be provided with intelligent viewing glasses are used in conjunction with A/V source content in relation to a smart glasses viewing area management system. In addition, when the person wearing the intelligent viewing glasses 100 changes a viewing direction from a first A/V source content to another location that is not directed toward the UWB RF tags 200, the captions which have been overlaid, scrolled, or displayed in the smart glasses are removed from the glasses until the person glances back in the direction of the UWB RF tags 200 associated with the A/V source content. Further details of the UWB RF tag 200, the viewing bridge 300, the mobile viewing bridge 400, and the intelligent viewing glasses 100 are described below by reference to FIGS. 2, 3, 4, and 5, respectively. In addition, several processes and methods of run-time or realtime processing by intelligent viewing glasses and viewing bridge content managers are described below by reference to FIGS. 7-9, and host services 1000 are further described below by reference to FIG. 10.

The smart glasses viewing area management system of the present disclosure generally works by way of a display management system that provides content to the caption glasses based on an identified object in the viewing cone area(s). Each caption object is associated with an RFID tag (with placement nearby the caption object) to uniquely identify the content to be displayed. The caption glasses will have three RF receivers that will read the RFID tag. The caption glasses will identify and transmit to the display management system the RFID tag in the viewing area. The display management system will send the associated content. Second, the caption glasses display the content when the glasses are in the specified viewing cone area for the object being viewed and in the correct orientation for viewing the object (the back or top of their head is not looking at the object). The RFID will be an Active Ultra Wide Band RFID Tag that will locate the display object with +/−2 cm. There will be three RF receivers in a tripod orientation that will detect side-to-side and up-and-down orientation and distance relative to the display object RFID Tag.

In some embodiments, the smart glasses viewing area management system and processes for managing content display in smart glasses constrain the caption glasses to only display content when the person wearing the caption glasses looks at a caption object that is associated with an RFID tag. The methodology allows caption glasses to establish the viewing cone area(s) and only display content when the person is focused on the display object and to seamlessly switch between objects based on the viewing cone areas for multiple video or audio objects.

To make the smart glasses viewing area management system of the present disclosure, there is a combination of hardware and software involved. The RFID tag is a third party component that can be purchased. The viewing bridge (aka, "Oorcas box") is created and programmed and includes the components, power supply, and antenna. The viewing bridge (or "Oorcas box") will include third party speech to text application. An application is written for a Mobile phone to connect, receive information, and transmit to the smart glasses as the mobile viewing bridge (app) described above. The intelligent viewing glasses are created with glasses (clear, prescription, or sunglasses), an RF Reader, and a display with WiFi and Bluetooth connectivity. There is a processor on-board that is programmed.

By way of example, FIG. 2 conceptually illustrates a block diagram of an ultra-wide band (UWB) RF tag 200 of the smart glasses viewing area management system. In some embodiments, the UWB RF tag comprises one of a basic UWB RF tag and a microphone enhanced UWB RF tag. In some embodiments, the basic UWB RF tag includes a UWB antenna, a power source, a control unit, a sequence generator, and a synchronization unit, while a microphone enhanced UWB RF tag further includes an optional microphone and associated components. The smart glasses viewing area management system of some embodiments includes a plurality of UWB RF tags. In some embodiments, the plurality of UWB RF tags include a plurality of basic UWB RF tags. In some embodiments, the plurality of UWB RF tags include a plurality of microphone enhanced UWB RF tags. In some embodiments, the plurality of UWB RF tags include a mix of basic UWB RF tags and microphone enhanced UWB RF tags. Thus, turning back to the UWB RF tags 200 of the smart glasses viewing area management system described above by reference to FIG. 1, those UWB RF tags 200 may include any combination of basic and microphone enhance UWB RF tags.

The UWB RF tag 200 shown in this figure includes an UWB antenna 210, a power source 220, a control unit 230, a sequence generator 240, and a synchronization unit 250. Additionally, the UWB RF tag 200 demonstrated in this example further includes the optional microphone, making it a microphone enhanced UWB RF tag. Specifically, the optional microphone shown here includes a microphone 260, a noise cancellation 270 unit, memory 280, and a wireless Bluetooth communication module 290. In some embodiments, the power source 220 is a battery.

Now turning to another example, FIG. 3 conceptually illustrates a block diagram of a viewing bridge content manager 300 of the smart glasses viewing area management system. An example of a viewing bridge content manager (aka, "viewing bridge") is described above by reference to FIG. 1. The viewing bridge content manager 300 shown in this figure, however, includes further details of the view manager device and the input/output involved in its operation. Specifically, the viewing bridge content manager 300 includes a viewing bridge processor 305, a viewing bridge power supply 310, a viewing bridge WiFi wireless communications module 315, a viewing bridge captions decoder 320, a viewing bridge data stream manager 325, a viewing bridge speech-to-text module 330, and a viewing bridge viewing area positioning manager 335.

When the viewing bridge content manager 300 is started with adequate power from the viewing bridge power supply 310, the viewing bridge processor 305 and the viewing bridge WiFi module 315 are started. Video input 340 may be received by the viewing bridge captions decoder 320 of the viewing bridge content manager 300 at any time during operation when intelligent smart glasses 100 create a viewing cone (referred to as a "viewing area for RFID tags 355" in this example) in relation to an A/V content source with one or more UWB RF tags. In some embodiments, a content script 345 is input to the viewing bridge data stream manager 325 of the viewing bridge content manager 300 for each tag ID. Similarly, audio is input to the viewing bridge speech-to-text module 330 viewing bridge content manager 300 for each tag. Some or all of the output from the viewing bridge captions decoder 320, the content script input 345 per tag ID, and the trascribed text from the viewing bridge speech-to-text module 330 is transferred to the viewing bridge data stream manager 325 and then transmitted to the viewing bridge viewing area positioning manager 335. In some embodiments, the viewing area for RFID tags 355 is received by the viewing bridge viewing area positioning manager 335 of the viewing bridge content manager 300 to position text for the captions in an appropriate viewing area.

By way of another detailed example, FIG. 4 conceptually illustrates a block diagram of a mobile viewing bridge content manager 400 of the smart glasses viewing area management system. An example of a mobile viewing bridge content manager (aka, "mobile viewing bridge app") is described above by reference to FIG. 1. The mobile viewing bridge content manager 400 shown in this figure, however, includes further details of the mobile viewing bridge app/device and the input/output involved in its operation. Specifically, the mobile viewing bridge content manager 400 includes a mobile OS processor 405, a mobile viewing bridge power supply 410, a mobile viewing bridge WiFi wireless communications module 415, a mobile viewing bridge Bluetooth wireless communications module 420, a mobile viewing bridge data stream manager 425, a mobile viewing bridge speech-to-text module 430, and a mobile viewing bridge viewing area positioning manager 435. In some embodiments, the mobile viewing bridge power supply 410 is a battery. In some embodiments, the content script input 345 is received at the mobile data stream manager 425 for each tag ID. In some embodiments, the audio input 350 is received by the mobile speech-to-text module 430 for each tag. Either or both of the content script input (per tag ID) and the transcribed text of the audio input 350 per tag is provided to the mobile data stream manager 425 and then to the mobile viewing area positioning manager 435 for screen layout/glasses layout positioning of text, scrolling, display based on the viewing area for the RFID tags 355.

Turning now to FIG. 5, block diagram 500 of intelligent viewing glasses used in a smart glasses viewing area management system is conceptually illustrated. An example of intelligent viewing glasses 100 is described above by reference to FIG. 1. As shown in this figure, the intelligent viewing glasses 100 includes a smart glasses display 510, a smart glasses audio receiver 520 to capture audio from RFID tag in a view area (or viewing cone), a smart glasses processor 530, a smart glasses UWB RF microphone 540, a smart glasses Bluetooth wireless communication module 550, a smart glasses view area calculator 560 to calculate the view area for the RFID tags, a smart glasses power supply 570, a smart glasses UWB RF reader 580, and a plurality of UWB antennas comprising a first UWB antenna 585a, a second UWB antenna 585b, a third UWB antenna 585c, and an optional fourth UWB antenna 590.

In some embodiments, the smart glasses UWB RF microphone 540 is connected to one or more UWB antenna(s) to receive the audio content. Based on the audio received by the smart glasses UWB RF microphone 540, the intelligent viewing glasses 100 triggers the smart glasses audio receiver 520 to capture audio from the identified tags in the view area (or calculated viewing cone).

In some embodiments, the smart glasses UWB RF reader 580 is communicatively connected to the plurality of UWB antennas to receive radio signals (RF signals) from the UWB RF tags 200 and read the signals to identify tag ID and tag location of each UWB RF tag 200. Based on the tag locations of the identified UWB RF tags 200 (with tag IDs), the intelligent viewing glasses 100 triggers the smart glasses view area calculator 560 to calculate the view area based on the tag locations.

Further details of the smart glasses UWB RF reader 580 are described next, by reference to FIG. 6, which conceptually illustrates a detailed block diagram 600 of the smart glasses UWB RF reader 580 included in the intelligent viewing glasses 100 used in the smart glasses viewing area management system. As shown in this figure, the smart glasses UWB RF reader 580 includes a transmitter 610, a multiplexer 625, and a receiver 630. The detailed block diagram 600 also shows decode bits 670 and antenna selector 675. Furthermore, the smart glasses UWB RF reader 580 utilizes the plurality of UWB antennas to send and receive signals via the transmitter 610 and the receiver 630, respectively. The transmitter 610 further includes a reader code sequence generator 615 and a pulse generator 620. The multiplexer 625 receives signals from the UWB antennas based on antenna selection from the antenna selector 675. The receiver 630 further includes a matched filter 635 module that is based on TX/RX switching of signal reception based on the UWB antenna selection by the antenna selector 675. A period V(T) is used to hold a first signal state 640 from the matched filter 635, which is then passed to a second signal state 645, to which the reader code sequence generator 615 can pass signal. An embedded summation calculator 650 (e.g., $\Sigma\ D_P$) is included in the receiver 630 to calculate a sum of distances for the UWB antennas. The receiver 630 further includes a detector 655 which provides decode bits 670 as output based on the input from the sum of distances. The sum of distances is also passed a tag code acquisition 660 unit of the receiver 630, which is then provided to a tag code sequence generator 665 of the receiver, to hold in the first signal state 640.

As the last several examples demonstrate, the smart glasses viewing area management system includes a plurality of components to make and use the system. In addition, several processes or methods are described next in which realtime and runtime aspects in some embodiments are detailed.

II. Smart Glasses Viewing Area Management Process

By way of example, FIG. 7 conceptually illustrates a viewing bridge run-time process 700 that is performed by a viewing bridge content manager. As shown in this figure, the viewing bridge run-time process 700 starts by initializing and connecting to a network (at 705). In some embodiments, each viewing bridge, intelligent viewing glasses, and UWB RF tags are identified, given unique identifiers (when registering as a new component), and connected to the network. Next, the viewing bridge run-time process 700 determines (at 710) whether intelligent viewing glasses are already registered. When the intelligent viewing glasses are not registered, the viewing bridge run-time process 700 registers (at 715) the intelligent viewing glasses, and then proceeds to the next step. On the other hand, when the intelligent viewing glasses are already registered, then the viewing bridge run-time process 700 skips registration of the glasses and proceeds to the next step.

In some embodiments, the viewing bridge run-time process 700 registers view tags (at 720) as the next step. After view tags are registered, the viewing bridge run-time process 700 of some embodiments sets up audio listening (at 925) for all, some, one of, or none of the registered view tags and for each content source. This completes several initialization steps.

Next, the viewing bridge run-time process 700 of some embodiments starts post-initialization multi-threaded processing (at 730). In some embodiments, the viewing bridge run-time process 700 performs at least two threads simultaneously or contemporaneously with each other. In some embodiments, the two threads are split between audio speech processing thread and audio/video processing. Thus, in one thread of execution, input audio 735 per source tag ID is incoming such that the viewing bridge run-time process 700 captures (at 740) the audio content from the audio sources in relation to each source tag ID. Next, the viewing bridge run-time process 700 performs several speech-to-text processing and transcription steps. In some embodiments, the viewing bridge run-time process 700 transforms (at 745) the captured content type from speech (audio) to text (captions). In some embodiments, the viewing bridge run-time process 700 determines (at 750) whether language translation is needed. When language translation is not needed, the viewing bridge run-time process 700 proceeds to the next step of building (at 770) data stream text for display, which is described further below. However, when language translation is needed, the viewing bridge run-time process 700 translates (at 755) the text language to conversational language text, and then proceeds to the next step of building (at 770) data stream text for display, which is described further below. In some embodiments, the steps 745, 750, and 755 of the viewing bridge run-time process 700 are performed by way of host services 1000.

Turning back to the initialization of multi-threaded process (at 730), in another thread of execution, an input video source 760 is incoming such that the viewing bridge run-time process 700 captures content from the audio sources (at 765). This is followed by the viewing bridge run-time process 700 building (at 770) the data stream text for display. In some embodiments, the data stream of text includes captions that are not specifically formatted for visual output in the intelligent viewing glasses. For instance, one user of intelligent viewing glasses may prefer a configuration in which captions appear along a lower edge of display while another user prefers a configuration in which captions appear to scroll along the top edge of display—both of which would need to be applied to formatting and positioning of the text in the data stream. Also, input viewed tag ID area and distance per source is provided as data 775. With either or both of these text data stream sources, the viewing bridge run-time process 700 positions (at 780) the text in the viewing area and shows the distances to the source. Finally, the viewing bridge run-time process 700 outputs the display content (at 785). For example, the display content may be output as scrolling captions in the smart glasses of a person watching an A/V stream, such as a movie or show. Then the viewing bridge run-time process 700 ends.

Now, turning to another example process, FIG. 8 conceptually illustrates an intelligent viewing glasses run-time process 800 performed by intelligent viewing glasses during use. As shown in this figure, the intelligent viewing glasses run-time process 800 starts with initialization and connection to a network (at 805). Next, the intelligent viewing glasses run-time process 800 determines (at 810) whether the intelligent viewing glasses are connected or not. The intelligent viewing glasses can be connected to a system, such as a fully outfitted smart glasses viewing area management system (e.g., the smart glasses viewing area management system described above by reference to FIG. 1). On the other hand, the system to which intelligent viewing glasses connects may include only fewer components than a fully outfitted smart glasses viewing area management system, such as a viewing bridge content manager and at least one UWB RF tag that is associated with an A/V content source capable of displaying said video content.

When the intelligent viewing glasses are not connected, the intelligent viewing glasses run-time process 800 connects (at 815) the intelligent viewing glasses with the system. For example, the intelligent viewing glasses may be communicatively connected with a smart glasses viewing area management system that includes a complete set of the components described above by reference to FIGS. 1-6, or may be alternatively connected to a smaller scale system with a viewing bridge content manager, an A/V content source, and associated RFID tags. After connecting the glasses with the system, the intelligent viewing glasses run-time process 800 of some embodiments captures display content (at 820) from input display content 825. The input display content 825 may include captions associated with an A/V content source stream that is currently being viewed by a user of the intelligent viewing glasses. After the input display content 825 is captured, the intelligent viewing glasses run-time process 800 visually outputs (at 830) the content on the intelligent viewing glasses for display. Then the intelligent viewing glasses run-time process 800 ends.

Turning back to the determination (at 810) of whether the intelligent viewing glasses are connected or not, when the intelligent viewing glasses are already connected, then the intelligent viewing glasses run-time process 800 captures (at 835) RFID tag location and ID. In some embodiments, the intelligent viewing glasses run-time process 800 reads RFID tag IDs and transmission time data 840 from RF pulse signals of the tag. With the transmission time received, the intelligent viewing glasses run-time process 800 is able to calculate a location that is based on distance—calculated from difference between the time of reception and the time of transmission. Next, the intelligent viewing glasses run-time process 800 calculates (at 845) location of tags relative to the intelligent viewing glasses. From this calculation, the intelligent viewing glasses run-time process 800 is able to output a viewing area (view cone) of the tags. Then the intelligent viewing glasses run-time process 800 ends.

Similar to the viewing bridge run-time process 700 described above by reference to FIG. 7, another type of viewing bridge is demonstrated in FIG. 9. Specifically, FIG. 9 conceptually illustrates a mobile viewing bridge run-time process 900 that is performed by a mobile device with a mobile viewing bridge app installed and running.

As shown in this figure, the mobile viewing bridge run-time process 900 starts by initializing and connecting to a network (at 905). The mobile viewing bridge run-time process 900 then determines (at 910) whether intelligent viewing glasses are registered or not. When the intelligent viewing glasses are affirmatively registered, then the mobile viewing bridge run-time process 900 moves forward to the next step (skipping registration step(s) for the already registered glasses) of tag registration. On the other hand, when intelligent viewing glasses are not registered, the mobile viewing bridge run-time process 900 registers (at 915) the glasses, and then proceeds to tag registration as the next step. Accordingly, at the next step, the mobile viewing bridge run-time process 900 registers view tags (at 920) as the next step and then proceeds to set up audio listening (at 925) for all, some, one of, or none of the registered tags per A/V content source. This completes several initialization steps.

After the initialization steps are completed, the mobile viewing bridge run-time process 900 captures content (at 930) from audio sources. In some embodiments, input audio per source tag ID 935 is captured as incoming data by the mobile viewing bridge run-time process 900.

Next, the mobile viewing bridge run-time process 900 performs several speech-to-text processing and audio transcription steps which are further described below in connection with FIG. 10. Specifically, the mobile viewing bridge run-time process 900 transforms (at 940) the captured content type from speech (audio) to text (captions). In some embodiments, the mobile viewing bridge run-time process 900 then determines (at 945) whether language translation is needed. For example, literal transcription of a dialog or movie script may overcrowd a captions display, such as the display in the intelligent viewing glasses, or may obscure the meaning of conversations or dialog with unnecessary detail that could instead be succinctly summarized by a run-time language translation to a conversational style or other condensed style so that the transcription expresses virtually the same semantic value as a literal transcription. When language translation is not needed, the mobile viewing bridge run-time process 900 proceeds to the next step of building (at 955) data stream text for display, which is described further below. However, when language translation is needed, the mobile viewing bridge run-time process 900 translates (at 950) the text language to conversational language text or another condensed style of language. In some embodiments, viewing position considerations are weighed when determining with language translation is needed. In some embodiments, the steps 940-950 of the mobile viewing bridge run-time process 900 are performed by way of host services 1000, which is described further below by reference to FIG. 10.

In some embodiments, the mobile viewing bridge run-time process 900 proceeds to the next step of building (at 955) data stream text for display, which is described further below. Next, the mobile viewing bridge run-time process 900 positions text (at 960) in the viewing area and shows a distance to the source. Input of viewed tag ID area and distance per source 965 is fed as incoming data to the mobile viewing bridge run-time process 900 to use in positioning the text (at 960) in the viewing area and showing the distance to the source. After text positioning in the viewing area is completed, the mobile viewing bridge run-time process 900 outputs the text content for display (at 970). Then the mobile viewing bridge run-time process 900 ends.

III. Networked Host Services (Cloud or LAN)

Several examples described above refer to host services. In this section, networked host services are described by reference to FIG. 10. Specifically, FIG. 10 conceptually illustrates host services 1000 used in a networked environment by a viewing bridge content manager 300 and a mobile viewing bridge app 400. As shown in this figure, the host services 1000 include a host services management system 1010, a host services database 1020, a host services tag manager 1030, a speech-to-text module 1040, a visual content manager 1050, and a security manager 1060. The host services 1000 in this example are communicatively connected to the viewing bridge content manager 300 and the mobile viewing bridge app 400 by a network 1070. The network 1070 may be a local area network (LAN), a wide area network (WAN), a personal area network (PAN), a peer-to-peer network (P2P), a cloud-computing network (such as the public Internet, or privately secured systems implemented over the Internet), or any combination of the aforementioned network architectures. As such, it is possible to deploy multiple smart glasses viewing area management systems that a configured to register intelligent viewing glasses and UWB RF tags for use with multiple viewing bridge content managers and/or mobile viewing bridge apps.

Furthermore, it is possible to set up a plurality of varied smart glasses viewing area management systems intended for different usage and having similar, but ultimately different functionality. For example, the smart glasses viewing area management system of the present disclosure can be adapted for specialized usage and/or utilized in several different ways. Examples of different kinds of the smart glasses viewing area management system implementations include, without limitation, (i) intelligent viewing glasses usage for a medical patient in a hospital or in a clinic during a doctor visit when the patient may be hard of hearing and need to view captions of the information spoken by the doctor (or likewise), (ii) as customer assistive devices and system for assisting customers or patrons in ordering and with wait staff interactions in restaurants, stores, bars, etc., (iii) at movie theaters, (iv) during live theater performances or musicals, (v) at social gatherings or group meetings, (vi) in home watching TV and interacting with the family, (vii) for curated content displays at museums, public attractions, or art studios, etc.

The above-described embodiments of the invention are presented for purposes of illustration and not of limitation.

IV. Electronic System

Many of the above-described features and applications are implemented as software processes that are specified as a set of instructions recorded on a computer readable storage medium (also referred to as computer readable medium or machine readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

FIG. 11 conceptually illustrates an electronic system 1100 with which some embodiments of the invention are implemented. The electronic system 1100 may be a computer, phone, PDA, or any other sort of electronic device. Such an electronic system includes various types of computer readable media and interfaces for various other types of computer readable media. Electronic system 1100 includes a bus 1105, processing unit(s) 1110, a system memory 1115, a read-only 1120, a permanent storage device 1125, input devices 1130, output devices 1135, and a network 1140.

The bus 1105 collectively represents all system, peripheral, and chipset buses that communicatively connect the numerous internal devices of the electronic system 1100. For instance, the bus 1105 communicatively connects the processing unit(s) 1110 with the read-only 1120, the system memory 1115, and the permanent storage device 1125.

From these various memory units, the processing unit(s) 1110 retrieves instructions to execute and data to process in order to execute the processes of the invention. The processing unit(s) may be a single processor or a multi-core processor in different embodiments.

The read-only-memory (ROM) 1120 stores static data and instructions that are needed by the processing unit(s) 1110 and other modules of the electronic system. The permanent storage device 1125, on the other hand, is a read-and-write memory device. This device is a non-volatile memory unit that stores instructions and data even when the electronic system 1100 is off. Some embodiments of the invention use a mass-storage device (such as a magnetic or optical disk and its corresponding disk drive) as the permanent storage device 1125.

Other embodiments use a removable storage device (such as a floppy disk or a flash drive) as the permanent storage device 1125. Like the permanent storage device 1125, the system memory 1115 is a read-and-write memory device. However, unlike storage device 1125, the system memory 1115 is a volatile read-and-write memory, such as a random access memory. The system memory 1115 stores some of the instructions and data that the processor needs at runtime. In some embodiments, the invention's processes are stored in the system memory 1115, the permanent storage device 1125, and/or the read-only 1120. For example, the various memory units include instructions for processing appearance alterations of displayable characters in accordance with some embodiments. From these various memory units, the processing unit(s) 1110 retrieves instructions to execute and data to process in order to execute the processes of some embodiments.

The bus 1105 also connects to the input and output devices 1130 and 1135. The input devices enable the user to communicate information and select commands to the electronic system. The input devices 1130 include alphanumeric keyboards and pointing or cursor control devices. The output devices 1135 display images generated by the electronic system 1100. The output devices 1135 include printers and display devices, such as cathode ray tubes (CRT) or liquid crystal displays (LCD). Some embodiments include a touchscreen that functions as both an input and output device.

Finally, as shown in FIG. 11, bus 1105 also couples electronic system 1100 to a network 1140 through a network adapter (not shown). In this manner, the computer can be a part of a network of computers (such as a local area network ("LAN"), a wide area network ("WAN"), or an Intranet), or a network of networks (such as the Internet). Any or all components of electronic system 1100 may be used in conjunction with the invention.

These functions described above can be implemented in digital electronic circuitry, in computer software, firmware or hardware. The techniques can be implemented using one or more computer program products. Programmable processors and computers can be packaged or included in mobile devices. The processes and logic flows may be performed by one or more programmable processors and by sets of programmable logic circuitry. General and special purpose computing and storage devices can be interconnected through communication networks.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

The above-described embodiments of the smart glasses viewing area management system are presented for purposes of illustration and not of limitation. While these embodiments of the smart glasses viewing area management system have been described with reference to numerous specific details, one of ordinary skill in the art will recognize that the smart glasses viewing area management system and associated processes can be embodied in other specific forms without departing from the spirit of the invention. For instance, FIGS. 7-9 conceptually illustrate processes. The specific operations of each process may not be performed in the exact order shown and described. Specific operations may not be performed in one continuous series of operations, and different specific operations may be performed in different embodiments. Furthermore, each process could be implemented using several sub-processes, or as part of a larger macro process. Thus, one of ordinary skill in the art would understand that the invention is not to be limited by the foregoing illustrative details, but rather is to be defined by the appended claims.

I claim:

1. A smart glasses viewing area management system comprising:
   intelligent viewing glasses that are configured to turn on and off a display of textual captions associated with audio from a content source according to a field of view of a user of the intelligent viewing glasses, wherein the intelligent viewing glasses turn on the display of textual captions when the field of view of the user of the intelligent viewing glasses is directed toward the content source and turn off the display of textual captions when the field of view of the user of the intelligent viewing glasses is averted away from the content source;
   a plurality of ultra wideband (UWB) radio frequency (RF) tags positioned nearby and associated with an audio/visual (A/V) output device configured to display video and play audio from the content source, wherein two particular UWB RF tags in the plurality of UWB RF tags are positioned at outer boundaries of the A/V output device;
   a plurality of UWB antennas configured to receive radio signals from the plurality of UWB RF tags, wherein the plurality of UWB antennas are disposed along an outer frame of the intelligent view glasses;
   a UWB RF reader that is embedded within the intelligent viewing glasses and communicatively connected to the plurality of UWB antennas, wherein the UWB RF reader is configured to read radio signals received by the plurality of UWB antennas from the plurality of UWB RF tags and identify a tag ID and a tag location of each UWB RF tag;
   a viewing area calculator that is configured to calculate a view area associated with the A/V output device based on the tag locations of the UWB RF tags; and
   a viewing bridge content management device that is configured to provide textual captions of the audio to the intelligent viewing glasses when the field of view of the user of the intelligent viewing glasses is directed toward a location within the calculated view area.

2. The smart glasses viewing area management system of claim 1 further comprising a plurality of host services configured to provide the textual captions to the viewing bridge content management device.

3. The smart glasses viewing area management system of claim 2, wherein the plurality of host services comprises a host services management system that provides a network interface to communicatively connect to the viewing bridge content management device, a tag manager that registers each UWB RF tag in the plurality of UWB RF tags and provides the tag ID of each UWB RF tag as a unique UWB RF tag ID, a host services database that stores the unique UWB RF tag ID and the tag location of each UWB RF tag, a speech-to-text module that transcribes audio to a stream of text data, and a visual content manager that sets display position configuration information to visually output the stream of text data on the intelligent viewing glasses.

4. The smart glasses viewing area management system of claim 3, wherein the viewing bridge content management device provides the textual captions in realtime to the intelligent viewing glasses and in synchronization with the associated audio when the field of view of the user of the intelligent viewing glasses is directed to locations within the calculated view area.

5. The smart glasses viewing area management system of claim 1, wherein the viewing bridge content management device comprises a captions decoder that extracts captions data from video input, a viewing bridge speech-to-text module that transcribes audio input from each UWB RF tag into textual captions, and a data stream manager that extracts captions from content script input.

6. The smart glasses viewing area management system of claim 1, wherein the intelligent viewing glasses comprise a lens, a display overlaying the lens of the intelligent viewing glasses, a processor, and a power source.

7. The smart glasses viewing area management system of claim 6, wherein the view area calculator calculates the view area as a view area cone based on distances between the plurality of UWB antennas disposed along the outer frame of the intelligent view glasses, distances between the plurality of UWB RF tags, and distances between the two particular UWB RF tags and the plurality of UWB antennas.

8. The smart glasses viewing area management system of claim 7, wherein the view area cone corresponds with the field of view of the user of the intelligent viewing glasses when the field of view of the user is directed toward the locations within the view area, wherein the textual captions associated with audio from the content source are visually output onto the display overlaying the lens of the intelligent viewing glasses only when the field of view of the user of the intelligent viewing glasses corresponds with the view area cone, wherein visual output of the textual captions onto the display overlaying the lens of the intelligent viewing glasses ceases when the field of view of the user of the intelligent viewing glasses is directed to locations outside of the calculated view area.

* * * * *